Aug. 3, 1954
W. E. REVELL
2,685,138
CIRCULAR SIZE GAUGE
Filed Dec. 6, 1949
4 Sheets-Sheet 1
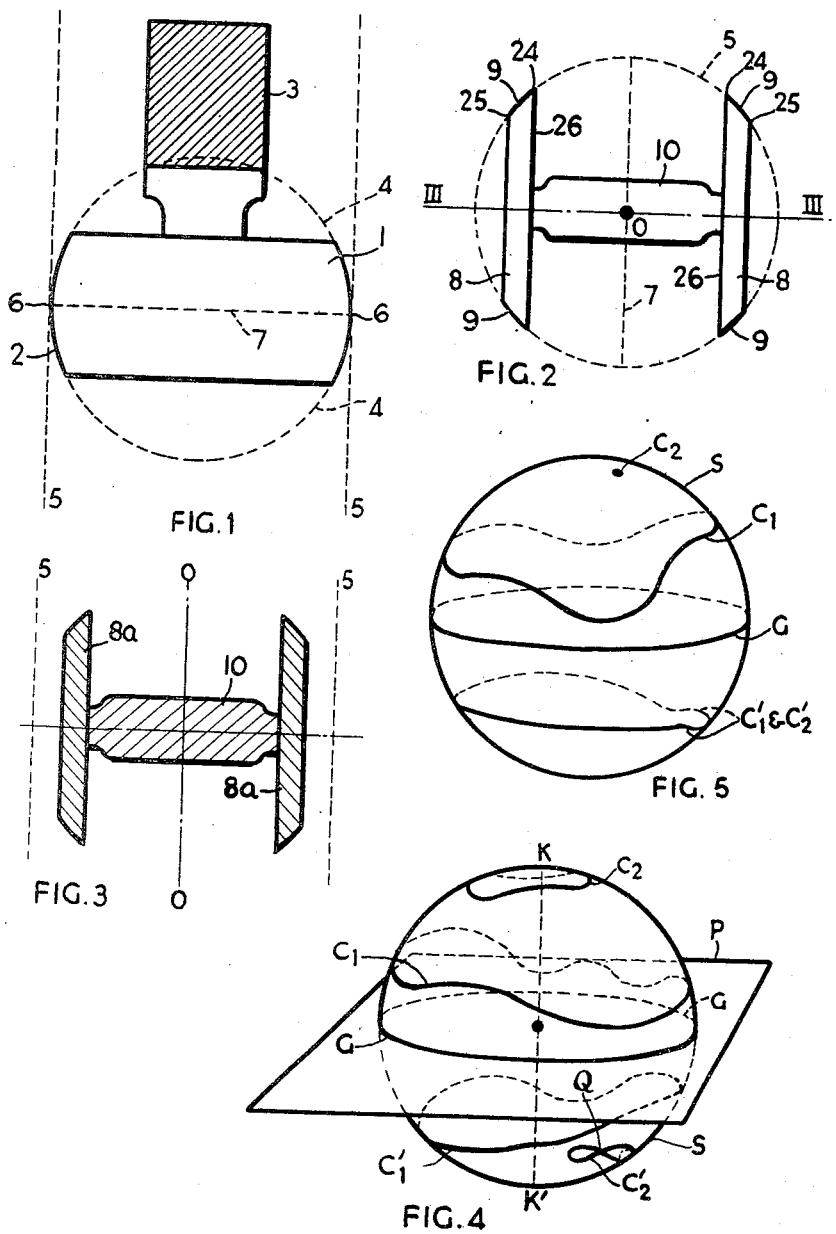
INVENTOR
WILLIAM EWART REVELL
BY
ATTORNEY Aug. 3, 1954  W. E. REVELL  2,685,138
CIRCULAR SIZE GAUGE Filed Dec. 6, 1949  4 Sheets-Sheet 2

INVENTOR
WILLIAM EWART REVELL
BY
ATTORNEY

Aug. 3, 1954  W. E. REVELL  2,685,138
CIRCULAR SIZE GAUGE
Filed Dec. 6, 1949  4 Sheets-Sheet 3
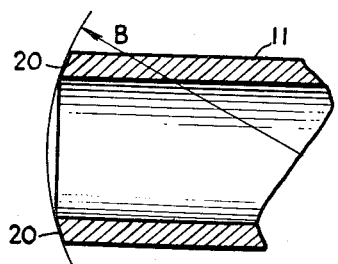
FIG. 12
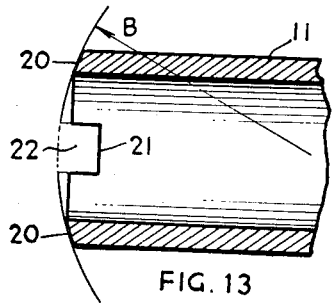
FIG. 13
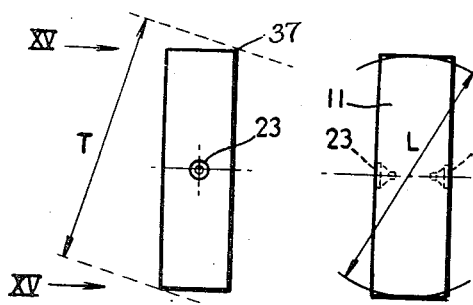
FIG. 14
FIG. 15
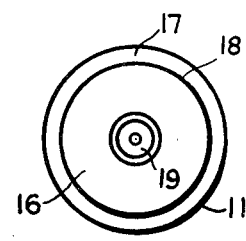
FIG. 11b
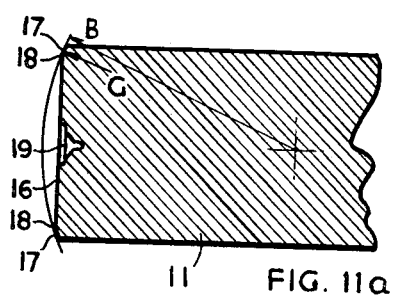
FIG. 11a
INVENTOR
WILLIAM EWART REVELL
BY
ATTORNEY Aug. 3, 1954   W. E. REVELL   2,685,138
CIRCULAR SIZE GAUGE
Filed Dec. 6, 1949   4 Sheets-Sheet 4

INVENTOR
WILLIAM EWART REVELL
BY
ATTORNEY

Patented Aug. 3, 1954

2,685,138

UNITED STATES PATENT OFFICE 2,685,138

CIRCULAR SIZE GAUGE

William Ewart Revell, Duston, England

Application December 6, 1949, Serial No. 131,443

Claims priority, application Great Britain
December 6, 1948

4 Claims. (Cl. 33—178)

This invention relates to gauges for the measurement of the diameter of circular holes and relates more particularly but not exclusively to gauges for holes of relatively large diameter. The diameter to which a gauge is designed is frequently referred to hereinafter as "the gauge length."

It is known to measure the diameter of holes more especially those of relatively large diameter by means of fixed gauges. Thus, for example, a plug gauge may be used but such a gauge becomes massive and expensive if it is to be used for holes in excess of three inches diameter. Furthermore unless a pilot is employed there is a serious risk of jamming with a large plug gauge. Alternatively it is also known to use a plain bar or segmental gauge of which the gauging member is a part of a cylinder, but here again the risk of jamming is great. Another known type of gauge is a pin gauge comprising a rod pointed at each end. These, however, are easily damaged and are likely to jam since there are no means of centralising the gauge in the hole to be measured and furthermore an accurate measure of diameter is only given if the gauge is centralised, that is to say held across the maximum chord and at ninety degrees to the axis of the hole.

In addition to plug and pin gauges, spheres accurately to size, and having a high surface finish, have been used for gauging circular holes. The use of such spheres has the advantage that a warning will be given that the hole is approaching the correct size while machining is in progress; but such spheres have the serious disadvantage that since contact between a cylindrical hole and a sphere which fits it is along a line forming a great circle (in the geometrical sense) of the sphere, the lines or areas of contact between a sphere and an actual hole which is approximately cylindrical and of approximately the correct size, lie in the neighbourhood of a great circle of the sphere, and the sphere will not indicate whether the hole departs somewhat from circularity. In general it can be assumed that the sphere detects the diameter of the largest circle which can be inscribed in the contour of the hole. Larger spheres also are undesirably heavy; proposals have been made to use the "equatorial section" of a sphere (i. e. a section lying between two planes which are parallel to the great circle which forms the gauging dimension of such a sphere), this reduces the weight but does not permit the gauge to detect lack of circularity.

The object of the present invention is to provide a gauge which does not suffer from the aforesaid disadvantages and which will give a warning that the hole while being machined is approaching the correct size.

Other objects of my invention will in part be obvious and in part will be pointed out hereinafter.

My invention accordingly consists in the features of construction, combinations of elements, arrangements of parts and series of steps which will be exemplified in the devices hereinafter described and of which the scope of application will be indicated in the appended claims.

In the accompanying drawings in which are shown various possible embodiments of my invention, Fig. 1 is a diagrammatic illustration of a conventional equatorial gauge;

Fig. 2 is a diagrammatic illustration of a gauge embodying my invention, the same being shown in a plane perpendicular to the axis of a gauged hole;

Fig. 3 is a diagrammatic illustration of the gauge shown in Fig. 2 as it appears when viewed substantially at the plane III—III;

Figs. 4 and 5 are perspective views of a sphere with markings thereon to illustrate certain terms used in the specification and claims;

Figs. 9, 10, 11a, 12 and 13 are views similar to Fig. 8 of gauging elements embodying modified forms of my invention;

Fig. 11b is an end view of the gauging element shown in Fig. 11a;

Fig. 14 is a side view of another modified form of gauging element constructed in accordance with my invention and capable of acting as a combined Go and Not-Go gauging element;

Fig. 15 is a front elevational view of the gauging element shown in Fig. 14;

Fig. 16b is an end view of a gauging element shown in Fig. 16a;

Fig. 17b is an end view of the gauging element shown in Fig. 17a;

Figure 6:
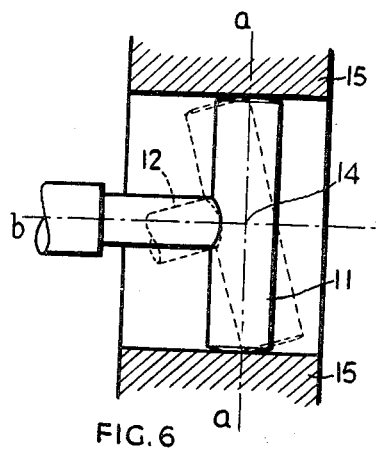
Fig. 6 is a side view of a simple form of gauge embodying my invention, the gauge being shown in a cylindrical hole.

The principle employed in gauges in accordance with the present invention is that, instead of using a great circle (or a zone lying in contiguity to a great circle) of a sphere, as the gauging line (or surface, as the case may be), use is made of a pair of lines (or surfaces) which lie on the surface of an imaginary sphere having a diameter equal to the diameter which it is required to gauge, these lines or surfaces lying one on each side of a great circle of the said sphere and being so disposed that they do not extend to the great circle on each side of which they lie. This principle will readily be understood from Figures 1, 2 and 3 of the accompanying drawings in which Figure 1 shows diagrammatically a conventional "sphere" gauge consisting of a steel disc 1 the peripheral surface 2 of which is formed as the equatorial section of a sphere (the outline of which sphere is shown dotted at 4). Such a gauge when inserted in a circular cylindrical hole (indicated by the dotted lines 5) having a diameter equal to that of the sphere, makes contact with the hole at points such as 6, 6 lying on a great circle of the sphere (indicated by the dotted line 7). The principle of the present invention, on the other hand, is illustrated in Figures 2 and 3, Figure 2 showing a cross-section perpendicular to the axis of the hole and Figure 3 a section of the hole by a plane III—III containing the axis of the hole. As before, the outline of the hole is indicated by the dotted lines 5, the line 5 being a circle in Figure 2 and being at the same time the outline of a sphere which would fit in the hole 5. But in this case the gauging surfaces consist of zones 8, 8 of the surface of the imaginary sphere which fits into the hole 5, which zones lie one on each side of a great circle 7 on the surface of that sphere and make contact with the hole along the lines 9, 9, 9, 9. (In Figures 2 and 3 the zones 8, 8 have the appearance of being slices cut from a sphere of the proper diameter, and are drawn as held at the appropriate distance from one another by the cross-member 10. In practice a different method of producing the gauging surfaces is advocated—instead of cutting them as slices from a sphere—as described below.) The actual steel components (8a, 8a) whose surfaces are the zones 8, 8, may conveniently be called the "heads" of the gauge, and this term will hereinafter be used to indicate disc-like or other elements on which gauging surfaces are formed and which are formed on or carried by a cross-member which supports them in the appropriate position.

It will be seen that the gauge shown in Figure 2 will give some indication of departure from circularity: for supposing it to be a fit in the hole when it is in the position shown, and supposing that the hole is elliptical instead of circular (the minor axis of the ellipse lying along the line III—III), the gauge will be loose in the hole if it is rotated through a right angle about the axis OO so that the centre line of the gauge is brought into coincidence with the position occupied by the line marked 7. Moreover, as will later be explained with reference to Figure 6 (described below) special care in ensuring that the centre line of the gauge lies in a plane perpendicular to the axis OO of the hole, is unnecessary; for since the gauging surfaces are spherical, the gauge will fit the cylinder of appropriate diameter until it (the gauge) has been tilted so far that the zones 8 cease to make simultaneous contact with the walls of the cylinder.

In principle, it is not necessary for the zones 8 to be of finite width, and they might (conceptually) be reduced to mere lines; but in practice it does not seem generally desirable that the zones 8 should be too narrow unless the working surfaces of the gauge are made of wear-resisting material, since the areas of contact with the hole would, if the zones 8 shrank to being geometrical lines, shrink to being point contacts, and a gauge thus used would be liable to rapid wear. Equally, while it is necessary that the zones 8 shall not extend to the great circle on each side of which they lie, it is not necessary that they should not extend as far as the poles of that great circle.

This latter arrangement in which the zones extend to (or substantially to) the poles as aforesaid, will provide a convenient form of gauge in accordance with the invention. Thus, a gauge in accordance with one aspect of the present invention, comprises a cylindrical rod or tube having the ends worked to form surfaces which are parts of the surface of a sphere, a diameter of which is coincident or substantially coincident with the longitudinal axis of the rod or tube, the diameter of the said sphere being equal to the required gauge length. It will be understood that the cylindrical rod or tube need not be a circular cylinder, but may be of polygonal, elliptical, or other cross-section provided that the outer surface of the rod or tube is a cylindrical surface in the sense in which those words are used in analytical geometry. Where the rod or tube is not of circular cross-section, the longitudinal axis is to be taken to be a line parallel to the generating line of the cylinder and passing through the centre of gravity of the outer boundary of the cross-section of the cylinder.

The principle of the invention having been explained in general terms earlier in this specification, and a statement of one aspect having been given in the immediately preceding paragraph, a precise statement of the topological definitions used in describing the invention will now be given. Consider a sphere of diameter equal to the diameter of the hole to be gauged, and suppose any plane be drawn passing through the centre of the sphere (and therefore intersecting the sphere in a great circle). Let two "first" closed (unicursal) curves be drawn, one on each of the hemispheres into which the sphere is divided by the said plane, neither of the said curves touching or intersecting the great circle defined by the said plane and each of them enclosing the corresponding pole of the sphere. Each of these "first" curves divides into two parts the hemisphere on which it is drawn, viz. the part contained between the "first" curve and the great circle aforesaid, and the part consisting of the remainder of that hemisphere, which remainder will be referred to as lying "inside" the "first" curve. Let a "second" closed curve be drawn on each hemisphere so that every point of each "second" curve coincides with, or lies in the part of the hemisphere "inside," the corresponding first closed curve. Each "second" curve may, as one limiting case, enclose an area so large that it coincides wholly with the corresponding "first" curve, or as the other limiting case, shrink until the area it encloses is zero. The part of a hemisphere lying between the "first" and the "second" curve, as above specified, will hereinafter be referred to as an "annule," for brevity. Where the "first" and "second" curves coincide, the annule becomes, as will be seen from the foregoing, itself a curve on the surface of the sphere (i. e. it coincides with the "first" curve); and where the area enclosed by the "second" curve is zero, the annule becomes the complete "polar cap" bounded by the "first" curve.

These definitions are illustrated in Figure 4 of the accompanying drawings, in which S is a spherical surface, P a plane passing through its center O and intersecting S in the great circle G, whose poles are K and K'. $C_1$ and $C_1'$ are two "first" unicursal curves, one lying on each of the hemispheres into which S is divided by P, while $C_2$ and $C_2'$ are two "second" curves lying "inside" $C_1$ and $C_1'$ respectively, within the meaning of the foregoing definitions. It will be noted that the "second" curves need not be unicursal, and $C_2'$ is shown in Figure 4 as having a double point Q. Figure 5 of the accompanying drawings shows examples of the limiting cases above referred to, the "second" curve $C_2$ on one hemisphere having degenerated to a point (so that the area inside $C_1$ forms a complete polar cap), while $C_2'$ coincides with $C_1'$.

In its broadest aspect, a gauge in accordance with the present invention has gauging curves or surfaces which constitute annules of a sphere of diameter equal to the required diameter of the hole to be gauged. Such annules may be formed on the ends of a rod or tube, as in the arrangement already described, or may be formed on any structural member of suitable material—the requirements as to the wear-resisting properties of the gauging surfaces, and the rigidity of the gauge, being well-known in the gauge-making art. The use of a rod as a structural member from which the gauge is fabricated, is, however, particularly convenient, since it lends itself to the method of manufacturing gauges.

Thus in a gauge in accordance with the invention, the gauging element may be constituted by a right circular cylinder or tube having plane ends, and the length and diameter of the cylinder are made such that the circles forming the boundaries of the ends of the cylinder (which circles form the gauging curves of the gauge) lie on the surface of a sphere of diameter equal to the required gauge length. Alternatively, the gauging surfaces may be formed on heads which are carried by a cross-member which maintains them in the correct position relatively to one another. It will be appreciated that the diameter of the ends of the cylinder, or of the gauging heads, should not be too great, i. e. the largest circle which can be drawn on the gauging surface (or the gauging curves themselves, where gauging surface reduces to a curve, as in the case of the circular cylinder just referred to) should not approximate too closely to a great circle of the circumscribing sphere, or the ability of the gauge to detect lack of circularity of a hole will be impaired—as will be appreciated from the explanations already given. The proportions to be adapted, in gauges in accordance with the invention, are a matter for intelligent compromise on the part of the designer.

The invention will now be further described by way of example with reference to Figures 6 to 18 of the accompanying drawings.

Figure 7:
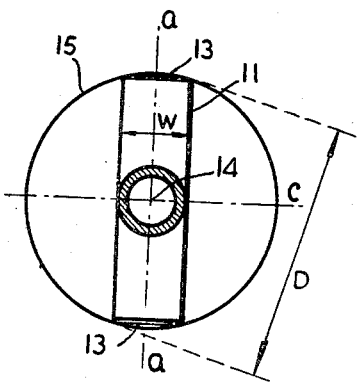
Fig. 7 is a front view of the gauge shown in Fig. 6.

In the arrangement shown in Figures 6 and 7, the gauging element 11 is carried by a handle 12 (shown as partly broken away). The gauging element 11 consists of a cylindrical steel bar of circular cross-section having "bevelled" edges 13 so worked that these edges fit a sphere (not shown) of diameter D equal to the diameter of the hole to be gauged, the centre of the sphere being at the mid-point 14 of the axis of the bar. The gauge is shown as being within a cylindrical hole of diameter D, the walls 15, 15 of the hole being shown cross-sectioned in Figure 6, and only the periphery of the hole being shown (and marked 15) in Figure 7. Since the surfaces of the "bevelled" edges, which constitute the gauging surfaces, are portions of the surface of a sphere having a diameter equal to the diameter of the hole when the diameter of the latter is correct, the gauging element continues to fit the hole if it is rotated about either the axis $a$—$a$ or the axis $b$—$b$. Likewise, because the gauging surfaces are parts of a sphere of the appropriate diameter, the gauge can be tilted through a considerable angle about the axis $c$—$c$ (away from a position in which the axis of the gauging element 11 is perpendicular to the axis $b$—$b$ of the hole), before it ceases to gauge to the correct diameter; this limiting position, shown in dotted line in Figure 6, is reached when the angle of tilt, $\theta$, is given by $$\sin \theta = W/D$$

W being the diameter of the cross-section of the gauging element (as indicated) and D being (as before) the gauging length (i. e. the diameter of the circumscribing sphere).

Figure 7 also serves to make clear two other merits of the gauge. Firstly, the gauge will indicate when the hole is approaching the correct diameter as machining of the hole proceeds, since (as can be seen from that figure) if the gauge is presented to the hole with its (the gauge's) axis coincident with the axis of the hole, the part of the gauge which first approaches the hole is that which lies in the plane containing the axis $a$—$a$ and the axis of the hole, and the length of the gauge (in the direction $a$—$a$) being less than the required diameter of the hole, the gauge will partially enter the hole if the actual diameter of the latter is nearly equal to its required diameter. Secondly, if the hole is non-circular, rotation of the gauge about the axis $b$—$b$ when within the hole will usually enable the non-circularity to be detected, since the gauge will be looser in some positions than in others—this second merit being one which is not possessed (except perhaps for some special forms of non-circularity) by the normal type of sphere gauge, as has already been mentioned.

Figure 8:
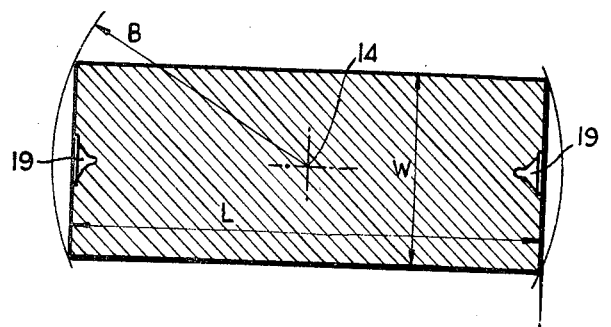
Fig. 8 is an axial sectional view of one form of gauging element usable in connection with the gauge shown in Figs. 6 and 7.

Figure 8 shows the most elementary form of the gauging element in accordance with the invention. It consists of a flat-ended cylindrical steel bar of circular cross-section of diameter W and length L, W and L being such that the distance B from the centre point 14 of the bar axis is equal to ½D, D being the gauge diameter of the hole to be gauged.

Figure 9:
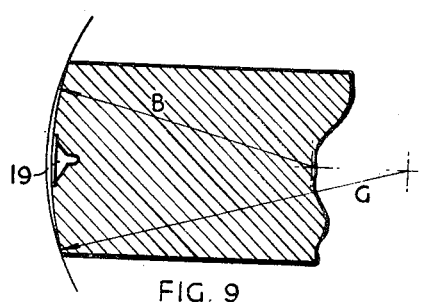
Figure 10:
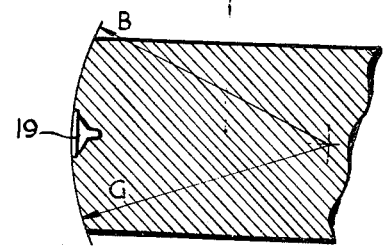

Figure 9 shows a gauging element similar to that in Figure 8, save that, instead of being flat-ended, the end surfaces of the bar are made spherical of radius G which is greater than the gauge radius B of the hole to be gauged, while Figure 10 is similar to Figure 9 save that the radius G of the end surfaces is equal to the radius B of the hole to be gauged.

Figures 11a and 11b show, respectively, a longitudinal cross-section and an end view of a gauging element 11 similar to that in Figure 7. The element 11 is of diameter W, and the major portion 16 of each end of the gauging element (only one end being shown) is flat; but each "corner" is "bevelled" away to form a surface 17 and worked to radius G (in a section by a plane, such as the plane of the cross-section, containing the longitudinal axis of the cross-section). This radius G may be equal to the gauge radius B of the hole (as shown)—in which case the surface 17 forms a zone of a spherical surface of radius B (and diameter D)—or the radius G may be less than the radius B, in which case the gauge makes contact with the hole (when the latter is of correct diameter) either at points lying on the circle 18 forming the "corner" in which surface 17 intersects the plane 16—the circle at each end of the gauging element then being an annule of a sphere of diameter D—or makes contact at points lying on a circle of radius R intermediate between ½W and the radius of the circle 18 (the said circle of radius R at each end of the gauging element being, in this latter case, an annule of a sphere of diameter D).

In each of Figures 8 to 10, 11a and 11b, a work centre or centres 19 is or are indicated, on which the bar was mounted while it was being worked to the correct gauge size. In order to manufacture the simplest form of gauging element of a gauge in accordance with the invention, all that is necessary is to take a bar or tube (examples of tubular gauging elements are described below) having an outer surface of circular cross-section and mount it on dead centres. The ratio of the length of the finished gauging element to its diameter may conveniently be about 3 to 1, and the intital length and diameter of the bar (before working to its final size) will, of course, be slightly greater than the final ones. The ends of the bar will normally be flattened (as shown in Figure 8) thus removing what may be described as the circumpolar regions of the gauge; and the material in the immediate neighbourhood of the poles will certainly be removed in the process of centering, with this method of production, even where the major part of the end of the gauge is spherical, as is illustrated in Figure 10. When the bar has been mounted on dead centres the cylindrical outer surface is ground to size, and the ends of the bar are then finally ground and lapped to bring it to its final length, if the bar is required to have the form shown in Figure 8. The bar is then mounted on a handle (such as 12 in Figure 6) if one is required—the bar in that case having been provided with a suitable tapped hole to receive the end of the handle before the grinding and lapping operations above referred to.

Where the ends of the bar are to be finished in any of the manners shown in Figures 9, 10 and 11a, the cylindrical surface is first ground as above described, and then, with the bar still mounted on the dead centres, the ends are turned by a tool mounted in a saddle capable of swinging about an axis perpendicular to (and passing through) the axis passing through the dead centres. The nose of the tool is thus arranged to describe a circular arc of radius G in a plane containing the axis passing through the dead centres; and accordingly, as the nose describes this curve while the bar is rotating on the dead centres, the effect is to generate a spherical end (of radius G) on the end of the bar as will be clear to those skilled in the art. The spherical surface is then ground—the grinding wheel being similarly mounted so that its surface swings on a radius G so as to generate a spherical surface on the end of the bar—and the surface is finally lapped.

In the arrangements in Figures 12 and 13, which show longitudinal sections through two forms of gauging element, the gauging element 11 is in each case formed from a steel tube (as will be clear from the sectioning) of which each end surface 20 is an annule which is a zone of a sphere of radius B. In manufacture, of course, suitable plugs (not shown in the drawings) are placed in the ends of the tube to provide the necessary means enabling the tube to be mounted on dead centres so that it may be worked to the desired dimensions and shape. Figure 13 illustrates another feature of the present form of gauge, namely that portions of the gauge may be cut away, as at 21 to clear projections such as 22 from the walls of a hole of which some part of the surface is part of a circular cylinder. (There are, of course, limits to the extent to which the hole can depart from circularity of section before it becomes impossible to use a gauge of the kind here described for gauging the residual circular part of the hole, but the general nature of these limitations will be so obvious to those skilled in the art that it is unnecessary to do more than mention the matter.)

Figures 14 and 15 show a modified form of gauging element in accordance with the invention, Figure 15 being a side elevation viewed in the direction of the arrows XV—XV in Figure 14. The gauging element here shown will serve as a combined Go and Not-Go gauge in a single unit. To produce it, a circularly cylindrical bar is first worked with plane parallel ends, the distance between the ends and the diameter of the bar being such that the edges 37 form annules (lines in this instance) of a sphere of diameter T equal to the Not-Go limit for the hole to be gauged (this working of the gauge to dimensions being carried out on centres, not shown, lying on the longitudinal axis of the gauge, as in the case shown in Figure 8). The bar is then rotated about centres 23, 23 (shown exaggerated in size for the sake of clarity) at the centre of the length of the bar, and is cylindrically ground and lapped to the lower limit (diameter L). During this second process, parts of the original annules (lines) are removed; and the resulting gauging element is such that it will enter a hole of the minimum diameter when presented to the hole with the axis of the centres 23—23 perpendicular to the axis of the hole, but cannot be rotated through a complete right angle about its (i. e. the gauging element's) longitudinal axis unless the diameter of the hole is as great as (or greater than) the Not-Go diameter (T) for the hole.

Figure 16A:
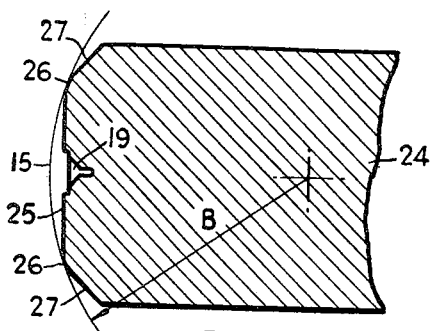
Fig. 16a is a fragmentary view similar to Fig. 8 of still another form of gauging element embodying my invention, said figure being taken substantially along the line XVI—XVI of Fig. 16b.
Figure 16B:
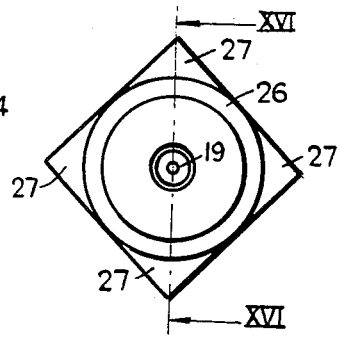
Figure 17A:
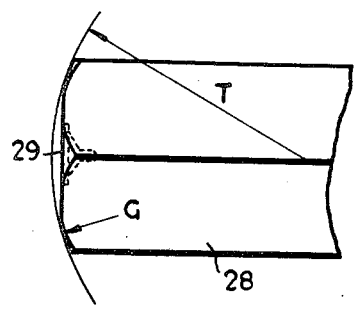
Fig. 17a is a front elevational view of yet another form of gauging element embodying my invention and constituting a combined Go and Not-Go gauging element, the element being shown in this figure in a position to function as a Not-Go gauging element.
Figure 17B:
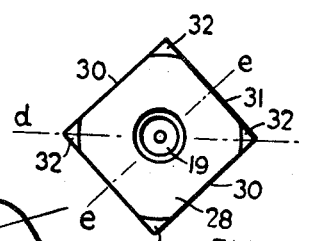
Figure 17C:
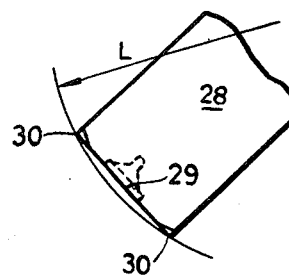
Fig. 17c is a view similar to Fig. 17a but showing the gauging element in a position to act as a Go gauging element.
Figure 18:
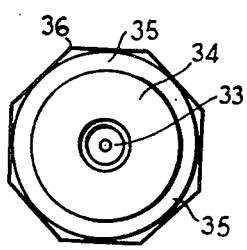
Fig. 18 is an end view of yet a different form of gauging element embodying my invention.

Finally, in Figures 16a and 16b, 17a, 17b and 17c, and in Figure 18, various modified forms of gauging element in accordance with the invention are depicted.

Figure 16a shows a section along the line XVI—XVI in Figure 16b, and Figure 16b an end elevation of a gauging element made from a rod 24 of square section. The end surfaces 25 (of which one only is shown) are ground flat over the majority of their area, but (having been mounted on centres 19 as previously described) are worked so that each bears an annulus 26 which is part of a sphere of radius B equal to the radius to which the hole 15 is to be gauged—each annulus 26 thus forming one of the annules of the gauge. The corners 27, 27, 27, 27 lying outside each annulus are then relieved as shown (so as to lie within the circumscribing sphere) and their surfaces may conveniently form segments of the surface of a cone. These corners thus give the gauge an increased lead for entering it into a hole which, as machining of the hole proceeds, is approaching its correct size.

Figures 17a, 17b and 17c illustrate a convenient way in which a square bar may be worked to provide a combined Go and Not-Go gauge. The square bar 28 is flatted at its ends (as at 29), and is of such length and cross-sectional dimension that it will just enter a hole of diameter equal to the lower limit to be gauged (i. e. the Go limit) when the bar is so presented to the hole that its central longitudinal plane e—e contains the axis of the hole—as illustrated in Figure 17c. Accordingly the edges 32, 32, at each end of the bar (only one end being shown) all lie on the surface of a cylinder of diameter 2L (L being the radius of the Go limit of the hole) having its axis coincident with e—e. (The edges 31, 31, at each end, similarly lie on a cylinder of diameter 2L, of course.) The bar is mounted on centres 19, and the corners 32, 32, 32, 32 are worked until they are parts of annules of a sphere of radius T equal to the Not-Go radius of the hole to be gauged. If presented to a hole of radius T, in the attitude shown in Figure 17a (i. e. with the diagonal longitudinal plane d—d of the bar containing the axis of the hole), the bar would just enter that hole. Accordingly, this bar serves as a gauging element for a Go and Not-Go gauge since it must enter the hole to be gauged when presented in the attitude shown in Figure 17c, but it must not be possible to rotate the bar about its longitudinal axis (i. e. the axis passing through the centres 19) through 45°. If it will rotate through 45° in this way, the hole is oversize.

Figure 18 shows an end elevation of a gauging element of octagonal cross-section. Each end of the element is provided with a center, as at 33, and the central zone 34 surrounding each centre 33 is finished flat. The zone 34 is surrounded by an annule 35 whose surface is worked to form part of the surface of a sphere of the appropriate diameter; and each corner, such as 36, is relieved (like the corners 27 of the gauging element shown in Figure 16a and 16b) so that its surface lies within the surface of the sphere just referred to, whereby the corners 36 give the gauge an increased lead for entering the hole to be gauged (as in the case of the gauging element shown in Figures 16a and 16b).

I claim:
1. A gauge for gauging circular holes comprising a handle having an axis which during gauging is substantially coincident with the axis of a hole being gauged, and a gauging member having gauging surfaces which lie on a sphere of the gauge diameter, said gauging surfaces being constituted by parts of two physically separate annules each bounded by a plane on the edge thereof remote from the other annule, which plane intersects said sphere, the two annules lying on opposite sides of an equatorial plane of the sphere, the diameter of the sphere passing thru the centers of the annules being transverse to the axis of the handle.

2. A gauge for gauging circular holes comprising a gauging member having gauge surfaces which lie on a sphere of the gauge diameter, said gauging surfaces being constituted by parts of two physically separate annules each bounded by a plane on the edge thereof remote from the other annule, which plane intersects said sphere, the two annules lying on opposite sides of an equatorial plane of the sphere and the line between their centers extending transversely to the axis of a hole being gauged.

3. A gauge according to claim 2 wherein the gauging member consists of a rod the major portion of each end of which is flat, at least a part of the edges formed between said ends and the lateral surface of said rod being shaped to lie on and form part of the surface of a sphere of diameter equal to the gauge length.

4. A method of manufacturing a gauge according to claim 2, comprising the step of mounting the gauge member between centres so that the line joining the centres is that which, when the gauge is in use is substantially perpendicular to the axis of the hole to be gauged and the step of working the annules on the gauging member adjacent the centres to required dimensions and form.

References Cited in the file of this patent

UNITED STATES PATENTS

| Number | Name | Date |
|---|---|---|
| 1,365,289 | Snell | Jan. 11, 1921 |
| 1,486,342 | Hoke | Mar. 11, 1924 |
| 1,605,160 | Blood | Nov. 2, 1926 |
| 2,423,094 | Gardner | July 1, 1947 |
| 2,472,139 | Aldeborgh et al. | June 7, 1949 |
| 2,494,168 | Forslund et al. | Jan. 10, 1950 |
| 2,546,154 | Gardner | Mar. 27, 1951 |
| 2,577,262 | Mueller et al. | Dec. 4, 1951 |

FOREIGN PATENTS

| Number | Country | Date |
|---|---|---|
| 885,634 | France | Sept. 21, 1943 |
| 584,512 | Great Britain | Jan. 16, 1947 |
| 616,542 | Great Britain | Jan. 24, 1949 |